US010920942B2

(12) United States Patent
Roach et al.

(10) Patent No.: US 10,920,942 B2
(45) Date of Patent: Feb. 16, 2021

(54) REAR FACING MULTI-LIGHT AND FUNCTION LIGHT BAR

(71) Applicant: Bestop Baja, LLC, Louisville, CO (US)

(72) Inventors: Alan R. Roach, Escondido, CA (US); Christopher C. Johnson, San Marcos, CA (US)

(73) Assignee: Bestop Baja, LLC, San Marcos, CA (US)

( * ) Notice: Subject to any disclaimer, the term of this patent is extended or adjusted under 35 U.S.C. 154(b) by 36 days.

(21) Appl. No.: 16/390,825

(22) Filed: Apr. 22, 2019

(65) Prior Publication Data

US 2019/0249836 A1 Aug. 15, 2019

Related U.S. Application Data

(63) Continuation of application No. 15/673,021, filed on Aug. 9, 2017, now Pat. No. 10,309,592.

(51) Int. Cl.
*F21S 4/28* (2016.01)
*B60Q 1/30* (2006.01)
(Continued)

(52) U.S. Cl.
CPC .............. *F21S 4/28* (2016.01); *B60Q 1/2607* (2013.01); *B60Q 1/2696* (2013.01); *B60Q 1/30* (2013.01);
(Continued)

(58) Field of Classification Search
CPC .... F21S 4/28; F21S 43/14; F21S 43/15; F21S 43/19; F21S 43/27; F21S 43/26; F21S 45/50; F21V 31/00; F21V 31/005
See application file for complete search history.

(56) References Cited

U.S. PATENT DOCUMENTS 3,691,366 A * 9/1972 Spreuer .................. B60Q 1/305
362/253
4,074,124 A 2/1978 Maute et al.
(Continued)

FOREIGN PATENT DOCUMENTS

CN 101592301 A 12/2009
CN 102095172 A 6/2011
(Continued)

OTHER PUBLICATIONS

"Practical Cold Extrusion Technology", Dec. 31, 2005, Jin Rengang, pp. 1-4.
(Continued)

*Primary Examiner* — William N Harris
(74) *Attorney, Agent, or Firm* — Lowe Graham Jones PLLC

(57) ABSTRACT

A rear facing light bar assembly that incorporates a plurality of light functions in a small integrated unit. A multifunctional circuit board powers different colored light emitting diodes to produce the tail light, brake light, amber and/or backup light. The assembly also has end caps, a one-piece polycarbonate tube lens and an extruded housing. Heat from the circuit board is dissipated through the end caps and into the extruded housing. The assembly is constructed such that the electronics are completely protected from the outside environment, and sealed from water and dust intrusion. The light also minimizes tooling and assembly cost, yet provides a secure seal protecting the electrical components. In addition, the light is serviceable so individual parts can be replaced or repaired if parts are damaged.

27 Claims, 8 Drawing Sheets

Related U.S. Application Data

(60) Provisional application No. 62/373,125, filed on Aug. 10, 2016.

(51) Int. Cl.

| | | |
|---|---|---|
| *F21S 43/14* | (2018.01) | |
| *B60Q 1/26* | (2006.01) | |
| *F21S 43/19* | (2018.01) | |
| *F21S 43/15* | (2018.01) | |
| *F21S 43/27* | (2018.01) | |
| *F21S 43/20* | (2018.01) | |
| *F21Y 103/10* | (2016.01) | |
| *F21Y 115/10* | (2016.01) | |

(52) U.S. Cl.
CPC ............. *F21S 43/14* (2018.01); *F21S 43/15* (2018.01); *F21S 43/19* (2018.01); *F21S 43/26* (2018.01); *F21S 43/27* (2018.01); *F21Y 2103/10* (2016.08); *F21Y 2115/10* (2016.08)

(56) References Cited

U.S. PATENT DOCUMENTS

| | | | |
|---|---|---|---|
| 5,103,382 A * | 4/1992 | Kondo | B60Q 1/302 362/249.04 |
| 5,103,385 A | 4/1992 | Federico et al. | |
| 5,132,885 A | 7/1992 | Hocheim et al. | |
| 6,186,649 B1 | 2/2001 | Zou et al. | |
| 7,556,396 B2 | 7/2009 | Kuo et al. | |
| 8,083,366 B1 | 12/2011 | Backer | |
| 8,330,362 B2 | 12/2012 | Lin | |
| 8,714,792 B2 * | 5/2014 | Adams | B60Q 1/2607 362/505 |
| 9,403,476 B2 * | 8/2016 | Hausler | F21S 43/27 |
| 9,452,707 B1 * | 9/2016 | Tsai | F21S 43/19 |
| 9,739,462 B2 * | 8/2017 | Georgitsis | F21V 5/04 |
| 10,309,592 B2 | 6/2019 | Roach et al. | |
| 2002/0036908 A1 * | 3/2002 | Pederson | F21K 9/00 362/545 |
| 2006/0126325 A1 | 6/2006 | Lefebvre et al. | |
| 2010/0171606 A1 * | 7/2010 | Law | B60Q 1/2696 340/468 |
| 2011/0141723 A1 | 6/2011 | Lai et al. | |
| 2012/0099326 A1 | 4/2012 | Hammond et al. | |
| 2014/0078762 A1 * | 3/2014 | Adams | F21S 43/14 362/496 |
| 2014/0192545 A1 * | 7/2014 | Law | B62D 35/001 362/485 |
| 2014/0301101 A1 * | 10/2014 | Russ | B60Q 1/44 362/520 |
| 2014/0317916 A1 | 10/2014 | Clifford | |
| 2015/0285472 A1 | 10/2015 | Evitt | |
| 2015/0316238 A1 | 11/2015 | Guilmette | |
| 2017/0184271 A1 * | 6/2017 | Norris | B60Q 1/34 |
| 2017/0297480 A1 * | 10/2017 | Elwell | F21S 45/47 |
| 2017/0313244 A1 * | 11/2017 | Luciew | B60Q 3/30 |
| 2018/0022268 A1 * | 1/2018 | Xie | F21V 17/02 362/487 |
| 2018/0080616 A1 * | 3/2018 | Elwell | B60Q 1/0088 |
| 2018/0202622 A1 * | 7/2018 | Arce | F21S 43/26 |

FOREIGN PATENT DOCUMENTS

| | | |
|---|---|---|
| CN | 202708679 U | 1/2013 |
| CN | 203940377 U | 11/2014 |
| CN | 104641173 A | 5/2015 |
| CN | 205118860 U | 3/2016 |
| CN | 105650568 A | 6/2016 |

OTHER PUBLICATIONS

"Machine Tool Design Manual", Oct. 31, 1997, Compile Group of Machine Tool Design Manual, pp. 548-549.

* cited by examiner

REAR FACING MULTI-LIGHT AND FUNCTION LIGHT BAR

CROSS-REFERENCE TO RELATED APPLICATIONS

This application is a continuation of U.S. patent application Ser. No. 15/673,021 filed August. This application claims the benefit of U.S. Provisional Application No. 62/373,125, Filed Aug. 10, 2016. The disclosures of the above applications are incorporated herein by reference.

FIELD OF THE INVENTION

The present invention relates to a rear facing light bar for mounting to a vehicle, such as a racing vehicle.

BACKGROUND OF THE INVENTION

Known attempts to create a rear facing light bar includes taking larger forward projecting light bars and replacing the circuit board with one that provides the functions of a tail light, brake light, warning light and back up light. The problem with this approach is that the light becomes very expensive, nearly equal to that of the forward projecting light bar, heavy and much larger in size than it needs to be. In addition, a forward projecting light requires individual optics, lenses and bezels so achieving a fully sealed light becomes much more difficult and expensive with the need of custom molded O-rings and careful assembly of the light. The custom seals are a big disadvantage when trying to produce an inexpensive light as they need custom molds to create them and a smooth surface to seal against, in addition to the added time to assemble the light. With the added parts and complexities that go into a forward projecting light this creates a prohibitive cost on the final product.

There are known rear light bars achieving the goal of being inexpensive but are lacking water-resistance and water-proofing qualities. In addition, the lack of thermal management does not provide optimal light all the time.

Accordingly, there exists a need for a device that replaces multiple rear facing lights with a single, multi-functional easy to connect integrated rear light bar in a simple compact design.

SUMMARY OF THE INVENTION

The present invention is directed to a rear facing light bar assembly that incorporates a taillight, brake light, amber warning light and a backup light (or blue light for racers) in a small integrated unit. The light is constructed such that the electronics are completely protected from the outside environment, and sealed from water and dust intrusion. The light also minimizes tooling and assembly cost, yet provides a secure seal protecting the electrical components. In addition, the light is serviceable so individual parts can be replaced or repaired if they get damaged.

The present invention solves these problems by four main pieces: the circuit board, end caps, one-piece polycarbonate tube lens and extruded housing. One key part of the light is the multifunctional circuit board that powers different colored light emitting diodes (LEDs) to produce the taillight, brake light, running light, amber and backup light/blue light, or flashing lights and any combinations thereof. Normally, the backside of this component is pressed against a heat sink for thermal management. However, with the present invention's board being thermally optimized any excess heat is dissipated through the billet aluminum computer numerical control (CNC) end caps that have direct contact with the circuit board for instant heat transfer. The direct contact is important in optimizing the flow of heat away from the circuit board, through the end caps and into the extruded housing.

Another key component of the part is the polycarbonate tube lens that surrounds the circuit board. This is a key aspect in the design of a low cost rear facing light bar due to its ease of use in assembly and seal friendly geometry. The circular shape plays a key role in adding durability and strength to the lens over a traditional flat lens. In addition, the cylindrical polycarbonate tube lens creates a tight seal between itself and the end caps using an off-the-shelf dual O-ring seal per side.

Significantly, all these parts are fitted into a lightweight aluminum extruded housing which by design requires no machining. All the extrusion requires is to be cut to the proper length. The unique design of the extruded housing gives the user infinite adjustability along the back of the light and on the top or bottom. This is accomplished by creating slots for the head of a ¼" bolt to slide into on the back surface of the housing. Since each piece of this light is inserted into one another (tube into the housing, circuit board into the tube and end caps into end of tube) the entire assembly can easily be disassembled with only one tool and serviced if needed.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Referring to the figures generally, the present invention provides a rear facing light bar assembly 10 (or "assembly") that provides integrated brake light and tail light functioning off the same LEDs. The assembly 10 includes a compact four wire cord to power all board functions. A ¾ pressure extruded housing holds the light and provides mounting functions for the user. A scalloped extrusion profile of the housing holds a polycarbonate tube of the light in place. Two continuous optics are shared by multiple LED's.

Referring to FIGS. 1-8 generally, there are many different components that go into making the assembly 10. The primary components include at least the following: at least one extruded housing shown generally at 12, at least one polycarbonate tube lens 14, dual circuit board assembly shown generally at 16, first and second CNC aluminum end caps (shown generally at 18 and 20), board link shown generally at 22, O-rings shown generally at 24 (preferably, dual O-rings) and cord overmold shown generally at 26.

Figure 1:
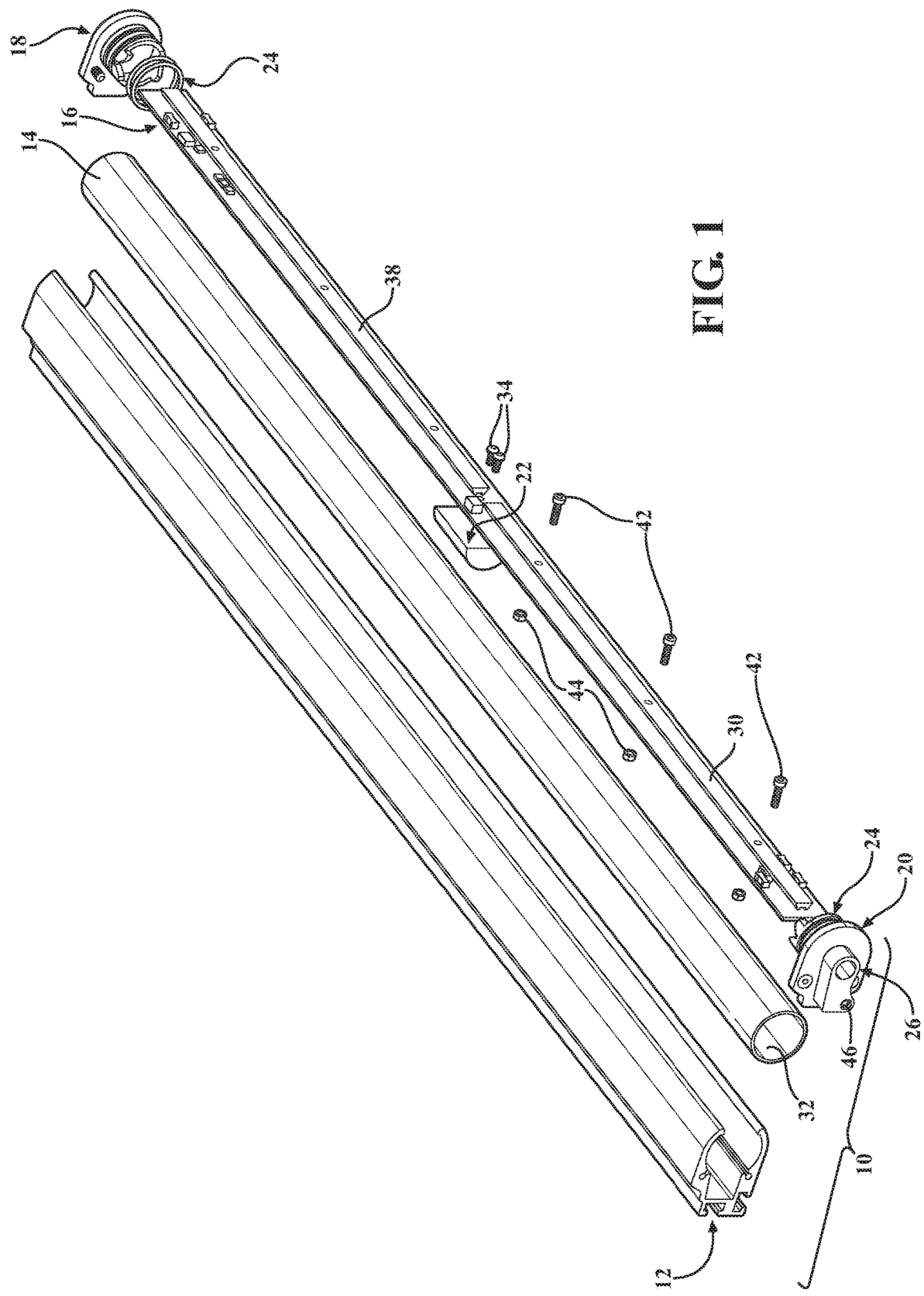
FIG. 1 is an exploded perspective view of the rear facing light bar assembly, in accordance with the present invention.
Figure 2:
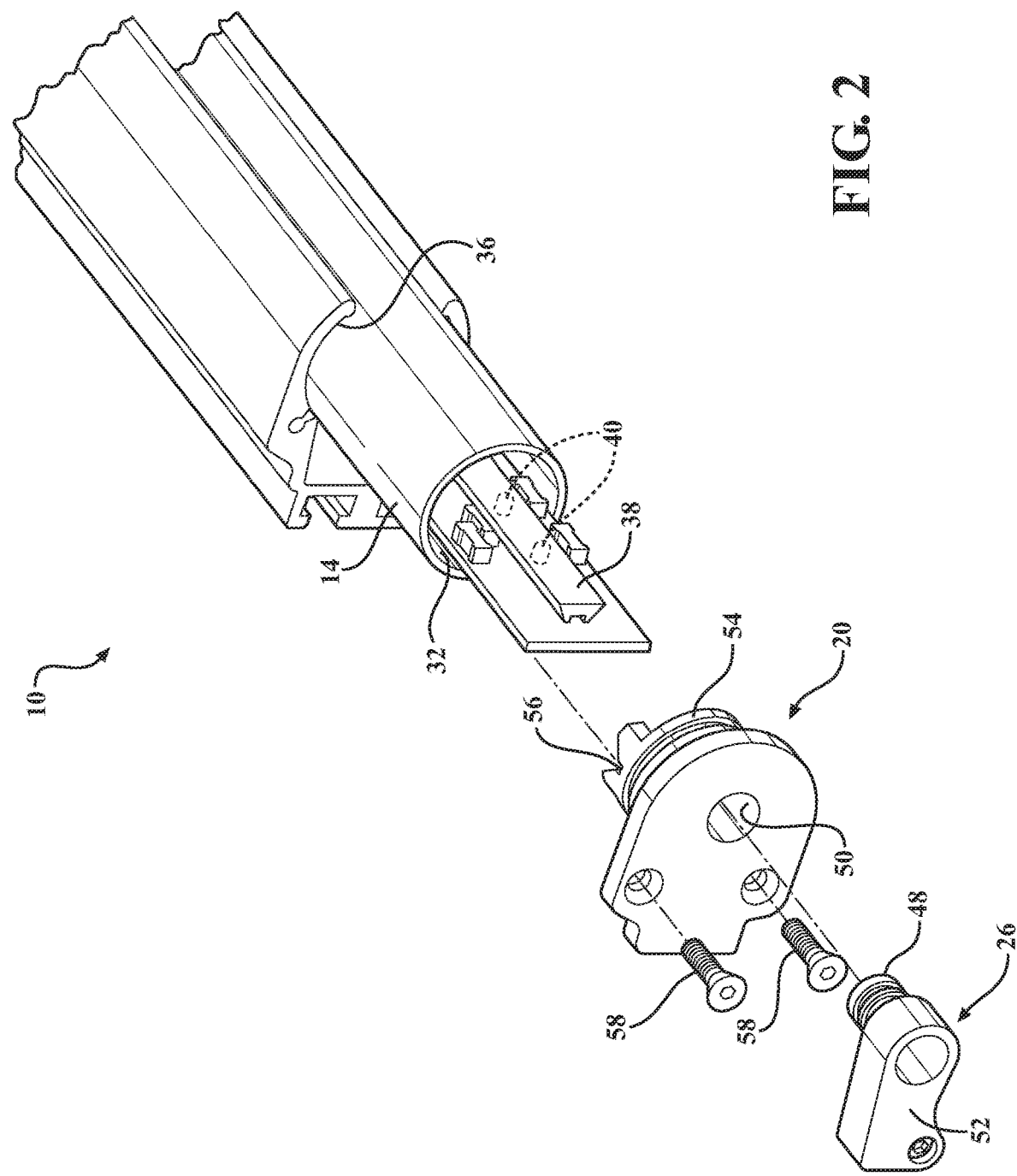
FIG. 2 is an exploded perspective view of the rear facing light bar assembly depicting a dual circuit board assembly within a tube, in accordance with the present invention.
Figure 3A:
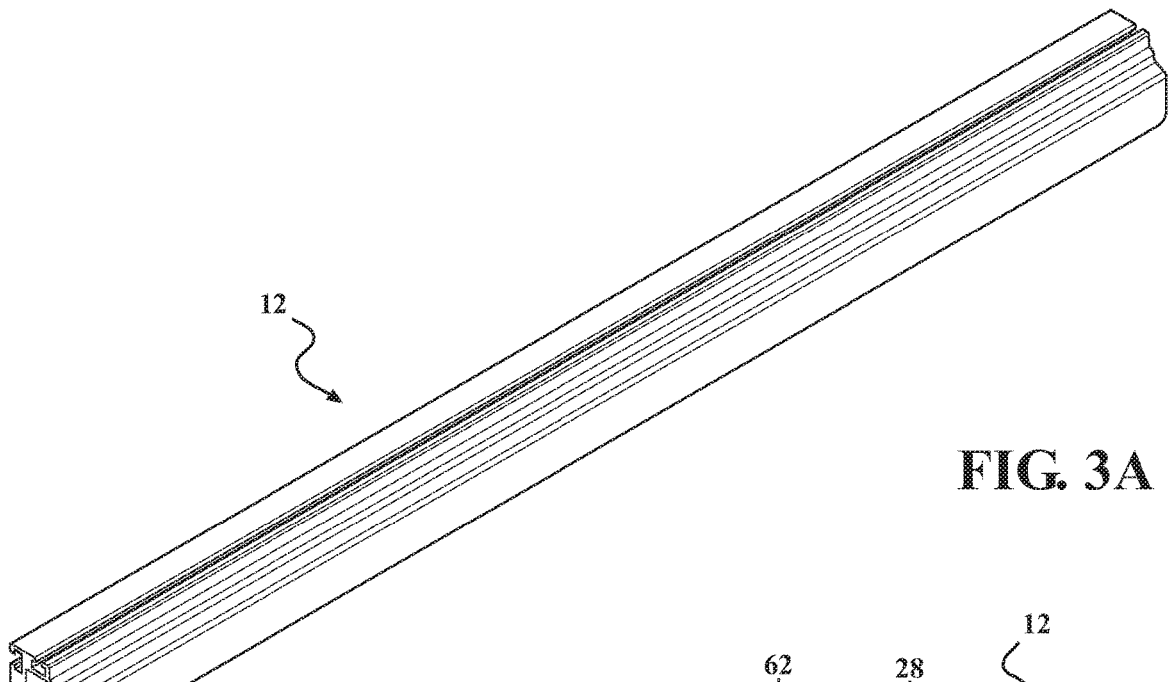
FIG. 3A is a perspective view of an extrusion of the rear facing light bar assembly, according to the present invention.
Figure 3C:
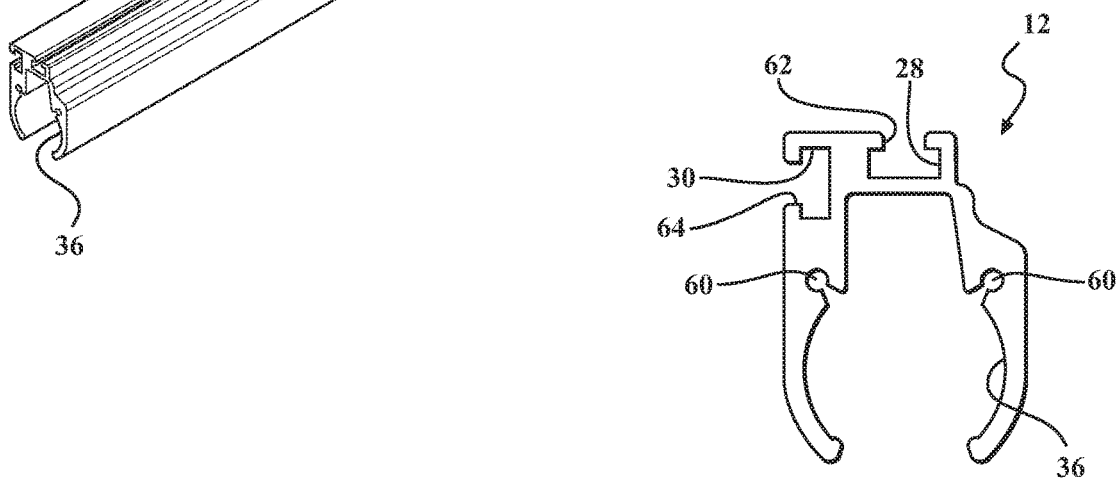
FIG. 3C is a front elevation of the extrusion of FIGS. 3A-3B.
Figure 3B:
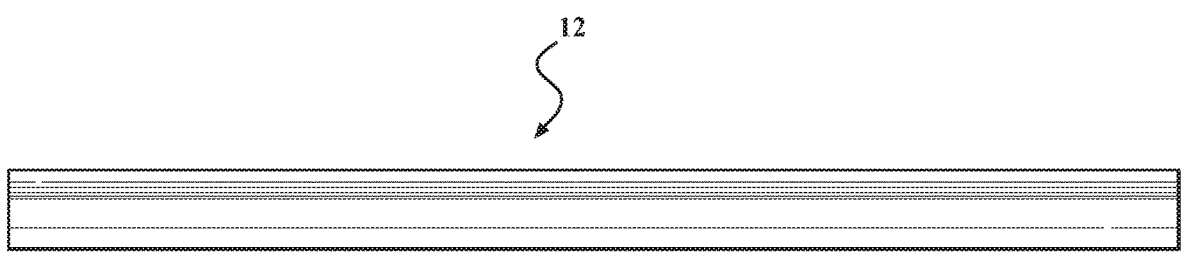
FIG. 3B is a side elevation of the extrusion of FIG. 3A.
Figure 4A:
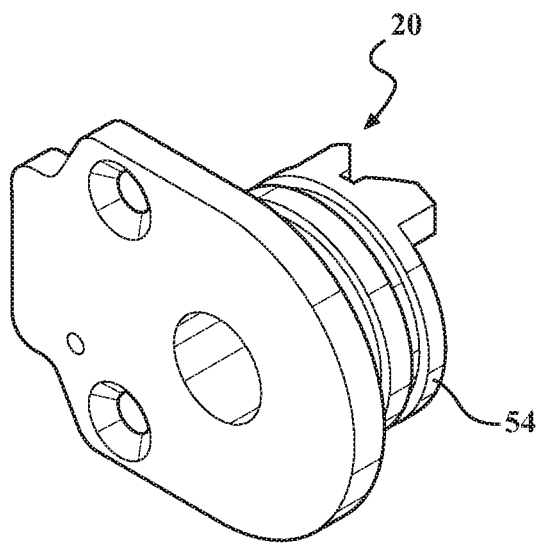
FIG. 4A is a perspective view of a second end cap of the rear facing light bar assembly, according to the present invention.
Figure 4B:
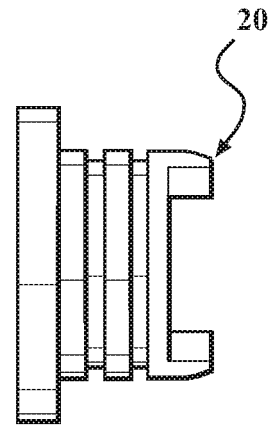
FIG. 4B is a side elevation of the end cap of FIG. 4A.
Figure 4C:
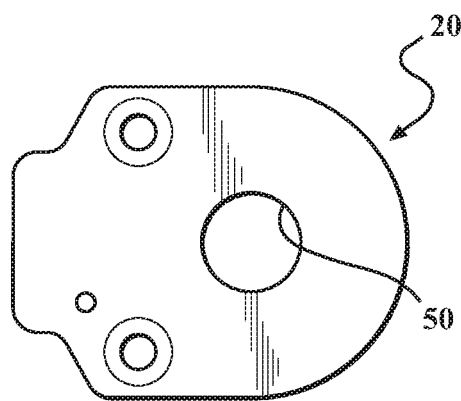
FIG. 4C is a front elevation of the end cap of FIGS. 4A-4B.
Figure 4D:
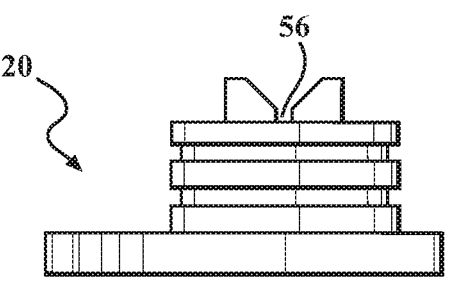
FIG. 4D is a top plan view of the end cap of FIGS. 4A-4C.
Figure 5A:
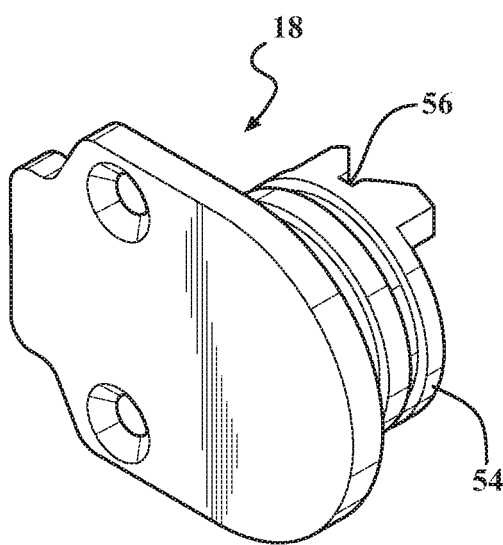
FIG. 5A is a perspective view of a first end cap of the rear facing light bar assembly, according to the present invention.
Figure 5B:
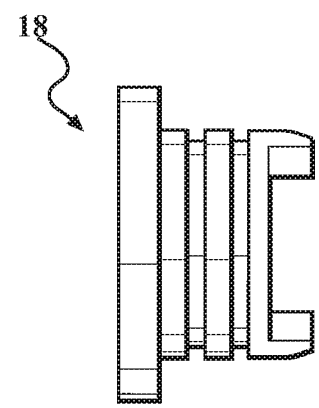
FIG. 5B is a side elevation of the end cap of FIG. 5A.
Figure 5C:
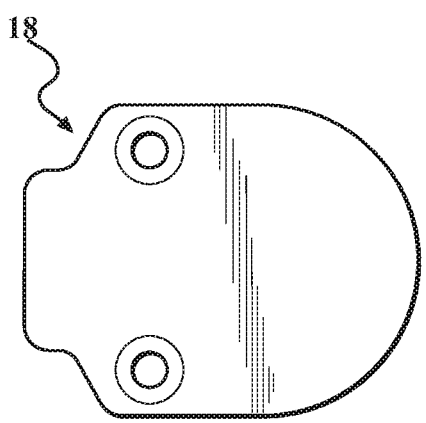
FIG. 5C is a front elevation of the end cap of FIGS. 5A-5B.
Figure 5D:
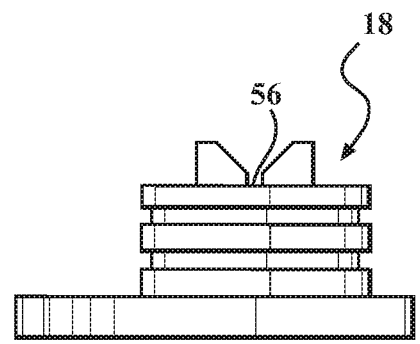
FIG. 5D is a top plan view of the end cap of FIGS. 5A-5C.

The way the assembly 10 is constructed according to one embodiment can be seen in FIG. 2. The extruded housing 12 is the main body and structure to the assembly 10. The extruded housings 12 function is to hold the polycarbonate tube lens 14 and provide mounting solutions to the user given its slotted back and bottom (first slot 28 and second slot 30) for infinite adjustability along the light. Inside the extruded housing 12 is the polycarbonate tube lens 14 and inside 32 the polycarbonate tube lens 14 is the dual circuit board assembly 16 that is held together by the board link 22 using a plurality of first fasteners 34, e.g., screws. The extruded housing 12 includes a channel 36 to hold the polycarbonate tube lens 14. The channel 36 is shaped to prevent the polycarbonate tube lens 14 from moving laterally out of the longitudinal opening of the extruded housing 36. More than one extrusion housing is contemplated without departing from the scope of the present invention depending on the application.

Preferably, the first and second slots 28,30 formed on the extruded housing 12 are channels that allow corresponding mounting features of the vehicle to slid along the channels 28,30, the channels 28,30 having smaller openings 62,64 to prevent the mounting features from moving laterally out of the channels 28,30.

At least one lighting device 38, preferably at least two continuous, or substantially continuous, optics shared by a plurality of LEDs 40, or other suitable lighting source with a plurality of LEDs is operably connected to the circuit board 16 with a plurality of second fasteners 42, e.g., bolt 42 and nuts 44. The circuit board 16 is multifunctional and powers different colored LEDs to provide predetermined functions in an integrated unit, e.g., produce the tail light, brake light, amber warning light, backup light, and/or backup blue light for racers, various beam patterns/intensity, etc and any combinations thereof.

The primary functions of the polycarbonate tube lens 14 are to protect the circuit board 16 from the environment, provide durable protection to internal components and project light emitted from the circuit board 16/lighting device 38. Once the circuit board 16 is inserted into the polycarbonate tube lens 14, the first and second end caps 18,20 and cord overmold 26 are ready to be installed.

The cord overmold 26, which houses the power cords for the circuit board 16, is operably fastened with at least one fastener 46, e.g., screw, into the second end cap 20, thereby self-sealing against the billet aluminum second end cap 20. According to one embodiment, the cord overmold 26 has a smaller diameter portion 48 that fastens through an aperture 50 provided in the second end cap 20 to which it is attached, e.g., threading engagement, and the at least one fastener 46 further secures an outward portion 52 of the cord overmold 26 to the second end cap 20. The first end cap 18 is not connected to a cord overmold 26 and has no power cord going through the first end cap 18, and, therefore, has no aperture 50 (see FIG. 5A).

The first and second end caps 18,20 each have at least one O-ring 24 connected about a smaller diameter portion 54 of the end caps 18,20. At least one slot 56, preferably, at least two slots 56,56, is/are formed in the smaller diameter portion 54 of both end caps 18,20 operable to align with and receive the ends of the circuit board 16. The smaller diameter portion 54 of the end caps 18,20 with the two o-rings 24 are inserted into the polycarbonate tube lens 14 locking the circuit board 16 in place with at least one slot 56 in both of the end caps 18,20. Most preferably, all of the slots 56 are chamfered slots, which allows the circuit board 16 with varying tolerances to be guided into the slot 54 quickly and easily during assembly. Additionally, the dual O-rings 24 create a uniform reusable seal protecting the circuit board 16 from the environment including but not limited to wind, water, dust and debris. The first and second end caps 18,20 are bolted into the extrusion housing 12 with a plurality of third fasteners 58, e.g., at least two bolts into apertures 60, to secure the end caps 18,20 in place. Other seals, or in addition to the O-ring 24, suitable for creating a tight seal with the polycarbonate tube 14 are contemplated without departing from the scope of the present invention.

The first and second end caps 18,20, e.g., made of billet aluminum or any other suitable material for heat sink, have direct contact with the circuit board 16 for instant heat transfer. The heat flows away from the circuit board 16 through the end caps 18,20 and into the extrusion housing 12 where it is dissipated.

Figure 6:
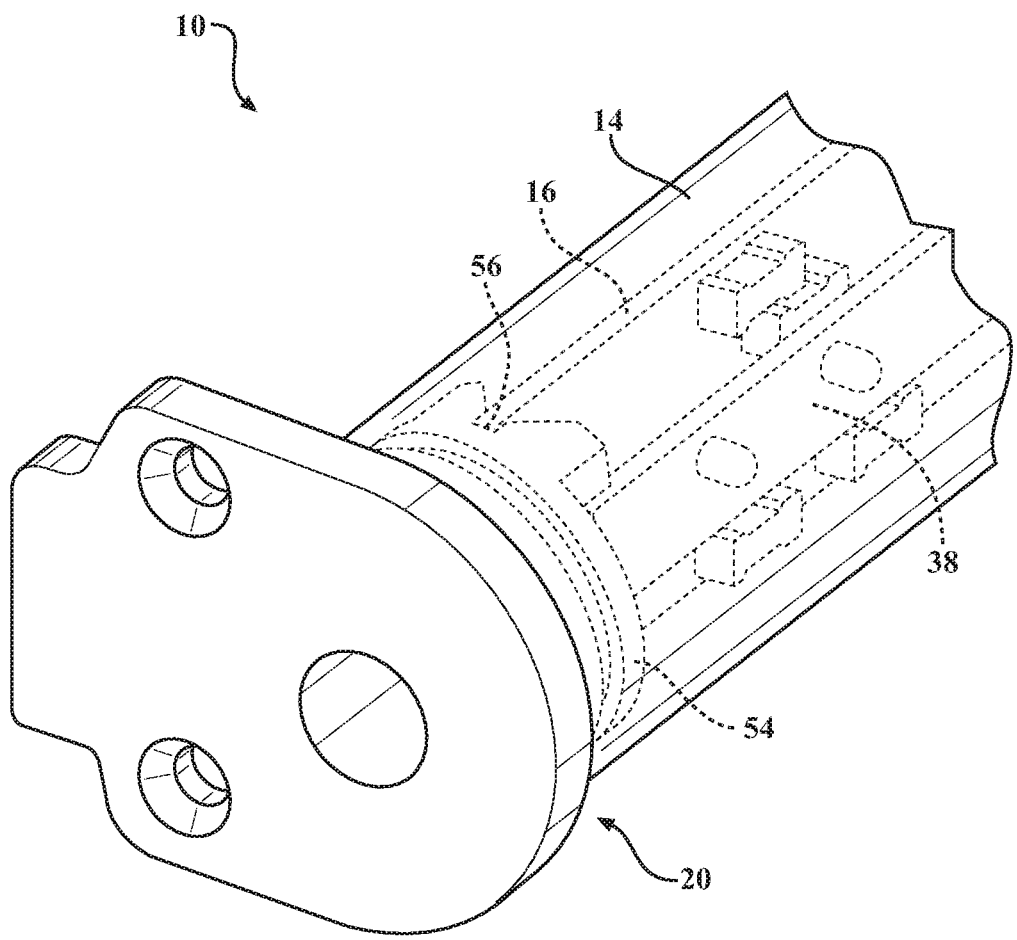
FIG. 6 is a perspective view of the assembly with the dual circuit board depicted inside the tube and received in a slot of the end cap.
Figure 7:
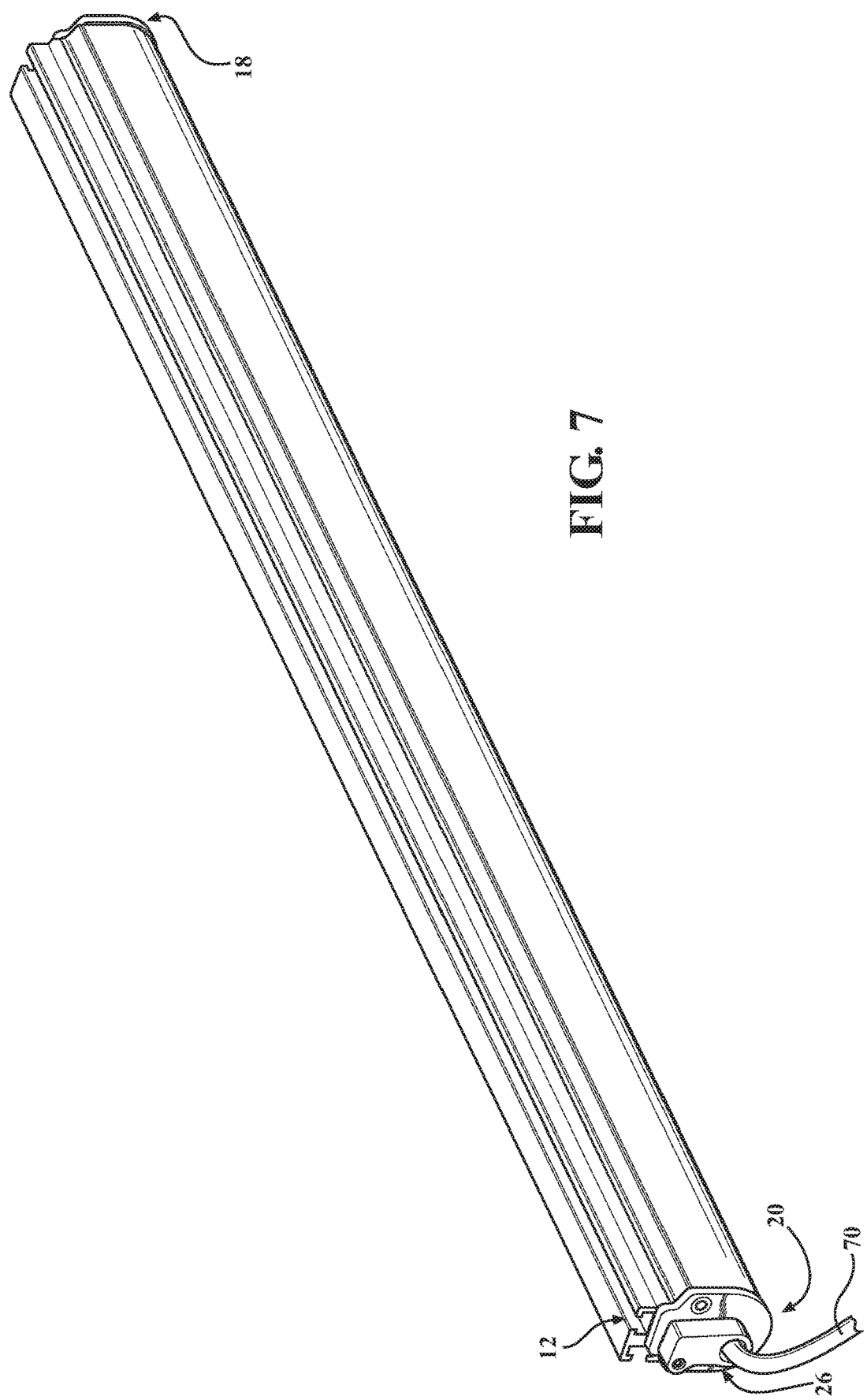
FIG. 7 is a perspective view of the assembly.

Referring now to FIG. 6, wherein the extruded housing 16 is omitted for clarity, there is depicted in phantom the dual circuit board 16 inside the tube 14 and held in the slot 56 formed in the smaller diameter portion 54 of the end cap 20. FIG. 7 is a perspective view of the assembly.

Figure 8:
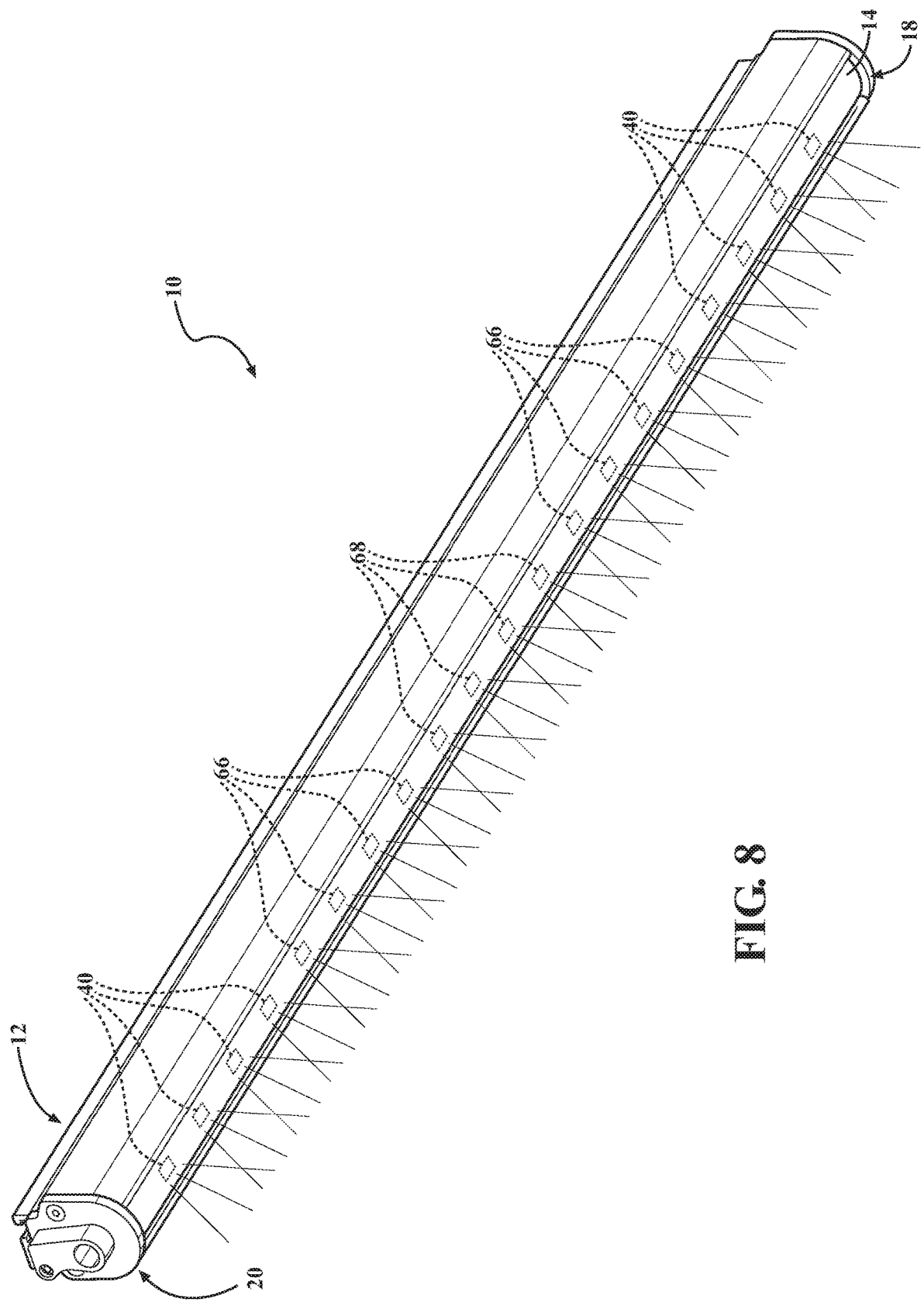
FIG. 8 is a perspective view of the assembly depicting different colored light emitting diodes (LEDs) to produce various lighting conditions.

Referring now to FIG. 8, according to an embodiment of the present invention, the multifunctional circuit board 16 powers different colored light emitting diodes (LEDs) correlating to vehicle to produce the taillight, brake light, running light, amber marker, blue safety marker, amber and backup light/blue light, green safety light, white light flashing lights, turn signals or any other suitable lighting and any combinations thereof. FIG. 8 illustrates a pair of a plurality of first LEDs 40, a pair of a plurality of second LEDs 66 and a plurality of third LEDs 68. By way of non-limiting example, the pair of first LEDs provide brake lighting (e.g., red LEDs), the pair of second LEDs provide amber lights (e.g., flashing amber LEDs, solid amber), and the third plurality of LEDs provide safety lights (e.g., blue LEDs, blue safety lights indicating slow moving vehicle, green LEDs, etc). The assembly 10 includes at least one cord 70, e.g., compact four wire cord, to power all circuit board 16 functions. The polycarbonate tube lens 14 permits the transmission of the light through the lens material. The material may be tinted or otherwise treated depending on the application without departure from the scope of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A rear facing light bar assembly for a vehicle, comprising:
    a housing;
    a lens coupled to the housing;
    a first end and a second end operably connected to ends of the lens;
    a plurality of light emitting diodes located within the lens operable to provide light signals including at least one stop light, at least one running light, at least one turn signal, and at least one reverse light;
    a circuit board operable to selectively power the plurality of light emitting diodes to provide predetermined lighting signal functions including at least stop light, running light, reverse light, and turn signal functions, said circuit board located within the lens and in direct contact with the housing and first and second ends to allow transfer of heat away from the circuit board;
    wherein the first and second ends are connected to ends of the housing, wherein the heat transfers away from the circuit board through the housing where it is dissipated.

2. The rear facing light bar assembly of claim 1, further comprising at least one O-ring provided on each of said first and second ends, wherein said at least one O-ring creates a weather tight seal between the lens and the first and second ends, respectively.

3. The rear facing light bar assembly of claim 2, wherein each O-ring is provided on a smaller diameter portion of each of the first and second ends and each smaller diameter portion is inserted into respective ends of the lens.

4. The rear facing light bar assembly of claim 1, wherein the first and second ends each include at least one slot sized to hold ends of the circuit board, respectively, to lock the circuit board in place inside the lens.

5. The rear facing light bar assembly of claim 4, wherein each slot is a chamfered slot to account for any varying tolerances of the circuit board by guiding the circuit board into the chamfered slot quickly and easily during assembly.

6. The rear facing light bar assembly of claim 1, further comprising a channel formed in the housing operable to hold the lens within the channel.

7. The rear facing light bar assembly of claim 1, wherein the first and second ends are connected to ends of the housing with a plurality of fasteners.

8. The rear facing light bar assembly of claim 1, wherein the first and second ends are billet aluminum.

9. The rear facing light bar assembly of claim 1, further comprising a cord overmold operably connected to one of the first or second ends, wherein at least one power cord for the circuit board extends through said cord overmold.

10. The rear facing light bar assembly of claim 9, wherein the cord overmold includes a smaller diameter portion operably connected to an aperture formed in the second end.

11. The rear facing light bar assembly of claim 1, wherein the plurality of light emitting diodes are arranged on at least one continuous optic in predetermined sequences of a predetermined plurality of colors.

12. The rear facing light bar assembly of claim 11, wherein the circuit board is a multifunctional circuit board that controls said plurality of light emitting diodes in plurality of colors to provide said predetermined lighting functions.

13. The rear facing light bar assembly of claim 12, wherein said predetermined lighting functions are selected from the group consisting of a tail light, brake light, warning light, back up light, and combinations thereof.

14. The rear facing light bar assembly of claim 1, wherein the housing includes a plurality of channels for mounting the rear facing light bar assembly.

15. A rear facing light bar assembly for a vehicle, comprising:
    a housing;
    a lens operably coupled to said housing;
    at least one circuit board operably sealed within said lens;
    a plurality of light emitting diodes operably sealed within said lens; and
    a first end and second end operably connected to the lens;
    wherein said rear light bar assembly incorporates a predetermined plurality of desired lighting functions.

16. The rear light bar assembly of claim 15, wherein said first and second ends have direct contact with said at least one circuit board for instant heat transfer, wherein heat flows away from said circuit board through said first and second ends and into said housing.

17. The rear facing light bar assembly of claim 15, further comprising at least one seal provided on each of said first and second ends, wherein said lens creates a tight seal between itself and the first and second ends using said seal on each end.

18. The rear facing light bar assembly of claim 15, further comprising at least one cord overmold, which houses power cords for said circuit board.

19. The rear facing light bar assembly of claim 15, wherein the housing is a lightweight aluminum extruded housing.

20. A rear facing light bar assembly for a vehicle, comprising:
    at least one housing;
    at least one lens coupled to the at least one housing;
    one or more circuit boards;
    at least one continuous lighting optic with a plurality of light sources operably coupled to the one or more circuit boards;
    a first end;
    a second end; and
    a cord overmold operably connected to the second end;
    wherein the lens surrounds the one or more circuit boards and creates a tight seal between the lens and the first and second ends using a seal located on each of the first and second ends; and
    wherein at least one of the circuit boards is a multifunctional circuit board that operably powers the plurality of light sources to selectively perform a plurality of predetermined lighting functions, said lighting functions selected from the group consisting of a tail light, brake light, warning light, back up light, and combinations thereof.

21. A rear facing light bar assembly for a vehicle, comprising:
    a housing;
    a lens coupled to the housing;
    a first end and a second end operably connected to ends of the lens to seal between the lens and the first and second ends;

a plurality of light emitting diodes located within the lens;
a circuit board operable to selectively power the plurality of light emitting diodes to provide predetermined lighting functions, said circuit board located within the lens and extruded housing and to allow transfer of heat away from the circuit board, wherein the circuit board is a multifunctional circuit board that operably powers the plurality of light sources to selectively perform a plurality of predetermined lighting functions, said lighting functions selected from the group consisting of a tail light, brake light, warning light, back up light, and combinations thereof.

22. A rear facing light bar assembly for a vehicle, comprising:
a housing;
a lens coupled to the housing;
a first end and a second end operably connected to ends of the lens to seal between the lens and the first and second ends;
a plurality of light emitting diodes located within the lens;
a multifunctional circuit board operable to selectively power the plurality of light emitting diodes to provide predetermined lighting functions, said circuit board located within the lens and housing and to allow transfer of heat away from the circuit board, wherein the plurality of light emitting diodes are arranged on at least one continuous optic in predetermined sequences of a predetermined plurality of colors which are controlled by the multifunctional circuit board to provide predetermined lighting functions.

23. A rear facing light bar assembly, comprising:
a housing;
a lens coupled to the housing;
a first end and a second end operably connected to ends of the housing;
a plurality of light emitting diodes located within the lens operable to provide light signals of two or more lights selected from a group consisting of blue, amber, green, white, red, and combinations thereof;
a circuit board operable to selectively power the plurality of light emitting diodes to provide predetermined lighting signal functions using said two or more lights, said circuit board located within the housing allow transfer of heat away from the circuit board.

24. The rear facing light bar assembly of claim 23 wherein the signal functions are selected from the group consisting of at least one stop/brake light, at least one running light, at least one turn signal, at least one reverse/backup light, at least one warning light, at least one tail light, at least one flashing light, at least one solid light, at least one color light, at least one white light, and combinations thereof.

25. The rear facing light bar assembly of claim 24 wherein the lights include at least a red light, an amber light, and a blue light.

26. The rear facing light bar assembly of claim 25 wherein at least a pair of like colored LEDs are used adjacent either end of the light bar.

27. The rear facing light bar assembly of claim 26 wherein a pair of first LEDs, a pair of second LEDs, and a pair of third LEDs are provided for providing brake lighting, running lights, and safety lights, respectively.

* * * * *